US010198135B2

United States Patent
Huang et al.

(10) Patent No.: US 10,198,135 B2
(45) Date of Patent: Feb. 5, 2019

(54) TOUCH CIRCUIT, TOUCH PANEL AND DISPLAY APPARATUS

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Fei Huang, Beijing (CN); Yun Qiao, Beijing (CN); Fuqiang Li, Beijing (CN); Cheng Li, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 305 days.

(21) Appl. No.: 15/129,176

(22) PCT Filed: Nov. 24, 2015

(86) PCT No.: PCT/CN2015/095372
§ 371 (c)(1),
(2) Date: Sep. 26, 2016

(87) PCT Pub. No.: WO2016/180003
PCT Pub. Date: Nov. 17, 2016

(65) Prior Publication Data
US 2018/0181227 A1    Jun. 28, 2018

(30) Foreign Application Priority Data

May 13, 2015  (CN) .......................... 2015 1 0243727

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04106* (2013.01)

(58) Field of Classification Search
None
See application file for complete search history.

(56) References Cited

U.S. PATENT DOCUMENTS

2013/0307817 A1  11/2013  Kim
2016/0049126 A1   2/2016  Zhang et al.
2016/0274713 A1   9/2016  Zhang et al.

FOREIGN PATENT DOCUMENTS

CN   103943055 A   7/2014
CN   104036738 A   9/2014
(Continued)

OTHER PUBLICATIONS

International Search Report and Written Opinion dated Feb. 23, 2016; PCT/CN2015/095372.
(Continued)

*Primary Examiner* — Robin Mishler
(74) *Attorney, Agent, or Firm* — Ladas & Parry LLP

(57) ABSTRACT

There are provided a touch circuit, a touch panel and a display apparatus. The touch circuit comprises: an input module (1), a reset module (2), a pull-up module (3), a pull-down module (4), a pull-down control module (5) and a touch signal output module (6), wherein the input module is configured to provide a signal of the first reference signal terminal to the first node; the reset module is configured to provide a signal of the second reference signal terminal to the first node; the pull-up module is configured to provide a signal of the first clock signal terminal to the control signal output terminal; the pull-down module is configured to provide a signal of the third reference signal terminal to the control signal output terminal; the pull-down control module is configured to ensure a potential of only one node of the
(Continued)

first node and the second node is a first potential at a same moment; the touch signal output module is configured to output a high frequency signal or a common voltage signal to a touch signal output terminal under the control of the control signal output terminal. The touch circuit, the touch panel and the display apparatus have a simple structure, and relatively low power consumption.

20 Claims, 12 Drawing Sheets

(56) References Cited

FOREIGN PATENT DOCUMENTS

| CN | 104571710 A | 4/2015 |
| CN | 104793805 A | 7/2015 |
| JP | 2008-140489 A | 6/2008 |

OTHER PUBLICATIONS

The First Chinese Office Action dated Jun. 2, 2017; Appln. No. 201510243727.7.

TOUCH CIRCUIT, TOUCH PANEL AND DISPLAY APPARATUS

TECHNICAL FIELD

The present disclosure relates to a touch circuit, a touch panel and a display apparatus.

BACKGROUND

With the rapid development of the display technique, a touch panel has become popular in the people's life gradually. At present, the touch panel can be divided, according to the composition and structure, into: an Add on Mode Touch Panel, an On Cell Touch Panel, and an In Cell Touch Panel. Herein, the Add on Mode Touch Panel means to manufacture the touch panel and the display screen separately, and then paste them together to form a display screen that has the touch function. The Add on Mode Touch Panel has deficiencies of relatively high manufacturing cost, relatively low light transmission rate, and relatively thick modules and so on. However, the In Cell Touch Panel embeds touch electrodes of the touch panel inside the display screen, which can reduce the thickness of the module as a whole, and can also reduce the manufacturing cost of the touch panel greatly, and thus it is preferred by a variety of panel manufacturers. In the In Cell Touch Panel technique, a mutual capacitive touch panel becomes a mainstream of the In Cell Touch Panel technique development at present due to its advantageous of relatively high flexibility and multi-point touch.

Specifically, the in cell touch panel is an apparatus whose touch scan lines and touch sense lines in the touch panel are integrated in the display screen, for example, the touch scan lines and the touch sense lines being integrated in a liquid crystal display (LCD) or an organic light emitting device (OLED).

At present, a touch driving circuit used to output touch scan signals to the touch scan lines is always integrated on an array substrate, so as to save wirings in a display frame area, so that a narrow frame design of a large-size display screen can be realized.

SUMMARY

There are provided in embodiments of the present disclosure a touch circuit, a touch panel and a display apparatus, which are used to solve problems of relatively complicated touch circuit structure and relatively large power consumption existing in the prior art.

There is provided in an embodiment of the present disclosure a touch circuit, comprising: an input module, a reset module, a pull-up module, a pull-down module, a pull-down control module and a touch signal output module, wherein:

the input module has a control terminal connected to an input signal terminal, an input terminal connected to a first reference signal terminal, and an output terminal connected to a first node, and is configured to provide a signal of the first reference signal terminal to the first node under the control of the input signal terminal;

the reset module has a control terminal connected to a reset signal terminal, an input terminal connected to a second reference signal terminal, and an output terminal connected to the first node, and is configured to provide a signal of the second reference signal terminal to the first node under the control of the reset signal terminal;

the pull-up module has a control terminal connected to the first node, an input terminal connected to a first clock signal terminal, and an output terminal connected to a control signal output terminal, and is configured to provide a signal of the first clock signal terminal to the control signal output terminal when a potential of the first node is a first potential;

the pull-down module has a control terminal connected to a second node, an input terminal connected to a third reference signal terminal, and output terminal connected to the control signal output terminal, and is configured to provide a signal of the third reference signal terminal to the control signal output terminal when a potential of the second node is the first potential;

the pull-down control module is connected to a second clock signal terminal, the first node and the second node respectively, and is configured to provide a signal of the second clock signal terminal to the second node under the control of the second clock signal terminal, control the potential of the second node as a second potential when the potential of the first node is the first potential, and control the potential of the first node as the second potential when the potential of the second node is the first potential;

the touch signal output module has a first input terminal connected to the control signal output terminal, a second input terminal connected to a high frequency signal terminal, and a third input terminal connected to a common voltage signal terminal, and is configured to output a high frequency signal or a common voltage signal to a touch signal output terminal under the control of the control signal output terminal; and when an active pulse signal of the input signal terminal is a high potential signal, the first potential is a high potential, and the second potential is a low potential; when an active pulse signal of the input signal terminal is a low potential signal, the first potential is a low potential, and the second potential is a high potential; and when the input signal terminal starts to output the active pulse signal, the first clock signal terminal and the second clock signal terminal output a first potential signal alternatively.

In a possible implementation, in the touch circuit provided in the embodiment of the present disclosure, the pull-down control module comprises: a first pull-down control unit, a second pull-down control unit and a third pull-down control unit; wherein the first pull-down control unit has a control terminal and an input terminal both connected to the second clock signal terminal, and an output terminal connected to the second node, and is configured to provide the signal of the second clock signal terminal to the second node under the control of the second clock signal terminal;

the second pull-down control unit has a control terminal connected to the first node, an input terminal connected to the third reference signal terminal, and an output terminal connected to the second node, and is configured to provide the signal of the third reference signal terminal to the second node when the potential of the first node is the first potential; and the third pull-down control unit has a control terminal connected to the second node, an input terminal connected to the third reference signal terminal, and an output terminal connected to the first node, and is configured to provide the signal of the third reference signal terminal to the first node when the potential of the second node is the first potential.

In a possible implementation, in the touch circuit provided in the embodiment of the present disclosure, the pull-down control module further comprises: a fourth pull-down control unit; wherein the fourth pull-down control unit has a control terminal connected to the control signal output terminal, an input terminal connected to the third reference signal terminal, and an output terminal connected to the second node, and is configured to provide the signal of the third reference signal terminal to the second node when the potential of the control signal output terminal is the first potential.

In a possible implementation, in the touch circuit provided in the embodiment of the present disclosure, the first pull-down control unit comprises a first switch transistor; wherein the first switch transistor has both a gate and a source connected to the second clock signal terminal, and a drain connected to the first node.

In a possible implementation, in the touch circuit provided in the embodiment of the present disclosure, the second pull-down control unit comprises: a second switch transistor; wherein the second switch transistor has a gate connected to the first node, a source connected to the third reference signal terminal, and a drain connected to the second node.

In a possible implementation, in the touch circuit provided in the embodiment of the present disclosure, the third pull-down control unit comprises: a third switch transistor; wherein the third switch transistor has a gate connected to the second node, a source connected to the third reference signal terminal, and a drain connected to the first node.

In a possible implementation, in the touch circuit provided in the embodiment of the present disclosure, the fourth pull-down control unit comprises: a fourth switch transistor; wherein the fourth switch transistor has a gate connected to the control signal output terminal, a source connected to the third reference signal terminal, and a drain connected to the second node.

In a possible implementation, in the touch circuit provided in the embodiment of the present disclosure, the touch signal output module comprises: a high frequency signal output unit, a common voltage signal output unit, a pull-up unit and a pull-down unit; wherein the pull-up unit has a control terminal which is a first input terminal of the touch signal output module, an input terminal connected to a low frequency signal terminal, and an output terminal connected to the third node, and is configured to provide a signal of the low frequency signal terminal to the third node when the potential of the control signal output terminal is the first potential;

the pull-down unit has a control terminal connected to an end signal terminal, an input terminal connected to the third node, and an output terminal connected to the third reference signal terminal, and is configured to provide the signal of the third reference signal terminal to the third node under the control of the end signal terminal;

the high frequency signal output unit has a control terminal connected to the third node, an input terminal which is a second input terminal of the touch signal output module, and an output terminal connected to the touch signal output terminal, and is configured to control the touch signal output terminal to output the high frequency signal when the potential of the third node is the first potential; and the common voltage signal output unit is connected among the third node, the third reference signal terminal, a fourth reference signal terminal, the common voltage signal terminal, and the touch signal output terminal, and is configured to control the touch signal output terminal to output the common voltage signal when the potential of the third node is the second potential.

In a possible implementation, in the touch circuit provided in the embodiment of the present disclosure, the pull-up unit comprises: a fifth switch transistor; wherein the fifth switch transistor has a gate connected to the control signal output terminal, a source connected to low frequency signal terminal, and a drain connected to the third node.

In a possible implementation, in the touch circuit provided in the embodiment of the present disclosure, the pull-down unit comprises: a sixth switch transistor; wherein the sixth switch transistor has a gate connected to the end signal terminal, a source connected to the third reference signal terminal, and a drain connected to the third node.

In a possible implementation, in the touch circuit provided in the embodiment of the present disclosure, the high frequency signal output unit comprises: a seventh switch transistor and a first capacitor; wherein the seventh switch transistor has a gate connected to the third node, a source connected to the high frequency signal terminal, and a drain connected to the touch signal output terminal; and the first capacitor is connected between the gate and drain of the seventh transistor.

In a possible implementation, in the touch circuit provided in the embodiment of the present disclosure, the common voltage signal output unit comprises: an eight switch transistor and a ninth switch transistor; wherein the eight switch transistor has a gate connected to the fourth reference signal terminal, a source connected to the common voltage signal terminal, and a drain connected to the touch signal output terminal; and the ninth switch transistor has a gate connected to the third node, a source connected to the third reference signal terminal, and a drain connected to the fourth reference signal terminal.

In a possible implementation, in the touch circuit provided in the embodiment of the present disclosure, the input module comprises: a tenth switch transistor; wherein the tenth switch transistor has a gate connected to the input signal terminal, a source connected to the first reference signal terminal, and a drain connected to the first node.

In a possible implementation, in the touch circuit provided in the embodiment of the present disclosure, the reset module comprises: an eleventh switch transistor; wherein the eleventh switch transistor has a gate connected to the reset signal terminal, a source connected to the second reference signal terminal, and a source connected to the first node.

In a possible implementation, in the touch circuit provided in the embodiment of the present disclosure, the pull-up module comprises: a twelfth switch transistor and a second capacitor; wherein the twelfth switch transistor has a gate connected to the first node, a source connected to the first clock signal terminal, and a drain connected to the control signal output terminal; and the second capacitor is connected between the gate and drain of the twelfth switch transistor.

In a possible implementation, in the touch circuit provided in the embodiment of the present disclosure, the pull-down module comprises: a thirteenth switch transistor; wherein the thirteenth switch transistor has a gate connected to the second node, a source connected to the third reference signal terminal, and a drain connected to the control signal output terminal.

Correspondingly, there is further provided in an embodiment of the present disclosure a touch panel, comprises a plurality of touch circuits connected in cascades provided in the embodiment of the present disclosure; wherein except for a first stage of touch circuit, control signal output terminals of other stages of touch circuits are all connected to a reset signal terminal of an adjacent previous stage of touch circuit; and except for a last stage of touch circuit, control signal output terminals of other stages of touch circuits are all connected to a signal input terminal of an adjacent next stage of touch circuit.

Correspondingly, there is provided in an embodiment of the present disclosure a display apparatus, comprising the touch panel provided in the embodiment of the present disclosure.

The touch circuit, the touch panel and the display apparatus provided in the embodiments of the present disclosure comprise: the input module, the reset module, the pull-up module, the pull-down module, the pull-down control module and the touch signal output module; wherein the input module is configured to provide a signal of the first reference signal terminal to the first node under the control of the input signal terminal; the reset module is configured to provide a signal of the second reference signal terminal to the first node under the control of the reset signal terminal; the pull-up module is configured to provide a signal of the first clock signal terminal to the control signal output terminal when a potential of the first node is a first potential; the pull-down module is configured to provide a signal of the third reference signal terminal to the control signal output terminal when a potential of the second node is the first potential; the pull-down control module is configured to provide a signal of the second clock signal terminal to the second node under the control of the second clock signal terminal, control the potential of the second node as a second potential when the potential of the first node is the first potential, and control the potential of the first node as the second potential when the potential of the second node is the first potential; and the touch signal output module is configured to output a high frequency signal or a common voltage signal to a touch signal output terminal under the control of the control signal output terminal. In this way, the function that the touch circuit outputs the touch signal is realized. Compared with touch circuit formed by adopting more thin film transistors to construct a transmission gate, an inverter and a tri-state gate in the prior art, the touch circuit provided in the embodiments of the present disclosure has a simple structure, and relatively low power consumption.

BRIEF DESCRIPTION OF THE DRAWINGS

FIG. 6a is a schematic diagram of an operating timing of the touch circuit as shown in FIG. 5a;

DETAILED DESCRIPTION

Implementations of a touch circuit, a touch panel and a display apparatus provided in embodiments of the present disclosure will be described in detail below in connection with accompanying figures.

Figure 1:
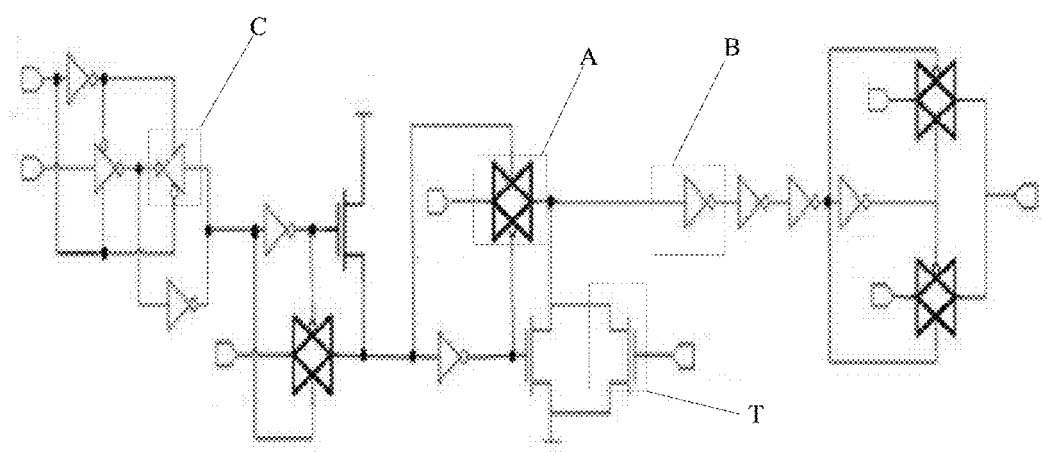
FIG. 1 is a schematic diagram of a structure of a commonly used touch circuit.

FIG. 1 shows a schematic diagram of a structure of a commonly used touch circuit. As shown in FIG. 1, touch scan signals on touch scan lines Txn (n=1, 2, 3, . . . ) are transmitted by an external driver (IC) through wirings located in a frame area. However, with the increasing of the size of a display screen, the number of the touch scan lines Txn increases. Then, wirings used for transmitting touch scan signals to the touch scan lines Txn increases correspondingly, thereby resulting in that space occupied by the wirings increases, and applications of in cell technique to a large-size and narrow-frame display screen are limited.

Figure 2:
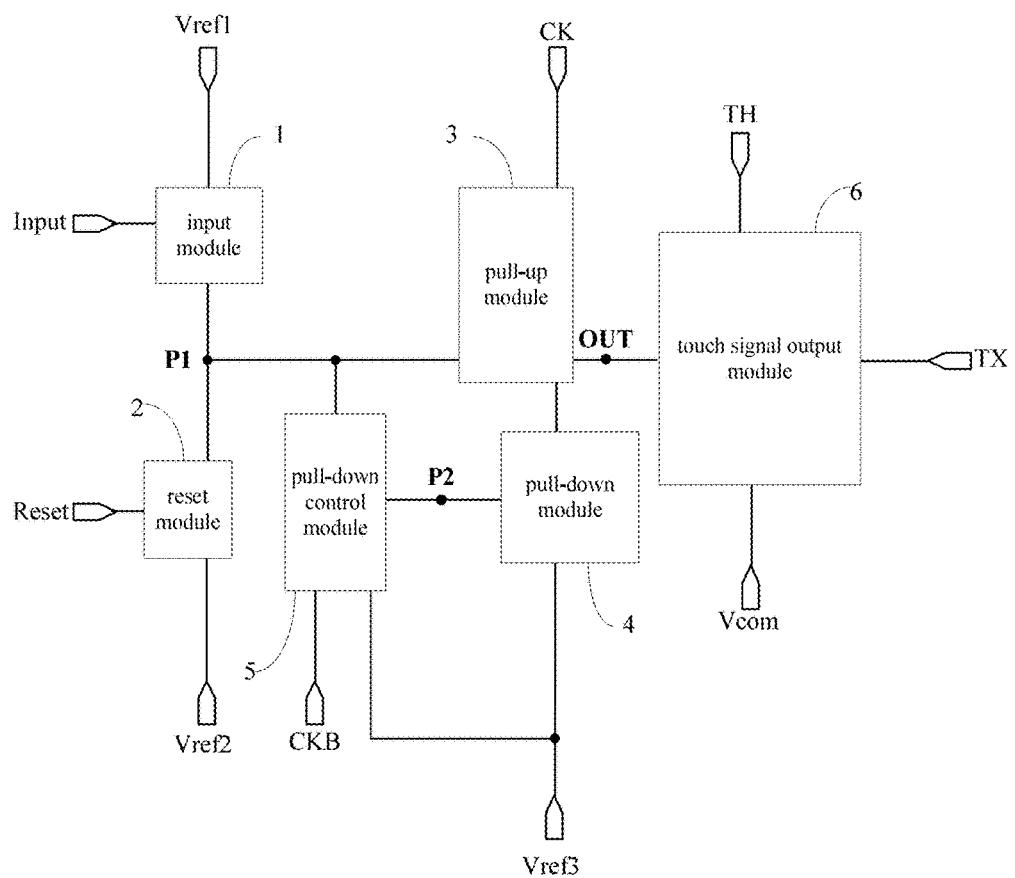
FIG. 2 is a schematic diagram of a structure of a touch circuit provided in an embodiment of the present disclosure.

FIG. 2 shows a schematic diagram of a structure of a touch circuit provided in an embodiment of the present disclosure. As shown in FIG. 2, the touch circuit comprises: an input module 1, a reset module 2, a pull-up module 3, a pull-down module 4, a pull-down control module 5 and a touch signal output module 6.

In the touch circuit as shown in FIG. 2, a control terminal of the input module 1 is connected to a signal input terminal Input, an input terminal thereof is connected to a first reference signal terminal Vref1, and an output terminal thereof is connected to a first node P1. The input module 1 is configured to provide a signal of the first reference signal terminal Vref1 to a first node P1 under the control of the input signal terminal Input.

A control terminal of the reset module 2 is connected to a reset signal terminal Reset, an input terminal thereof is connected to a second reference signal terminal Vref2, and an output terminal thereof is connected to the first node P1. The reset module 2 is configured to provide a signal of the second reference signal terminal Vref2 to the first node P1 under the control of the reset signal terminal Reset.

A control terminal of the pull-up module 3 is connected to the first node P1, an input terminal thereof is connected to a first clock signal terminal CK, and an output terminal thereof is connected to a control signal output terminal OUT. The pull-up module 3 is configured to provide a signal of the first clock signal terminal CK to the control signal output terminal OUT when a potential of the first node P1 is a first potential.

A control terminal of the pull-down module 4 is connected to a second node P2, an input terminal thereof is connected to a third reference signal terminal Vref3, and an output terminal thereof is connected to the control signal output terminal OUT. The pull-down module 4 is configured to provide a signal of the third reference signal terminal Vref3 to the control signal output terminal OUT when a potential of the second node P2 is the first potential.

Respective terminals of the pull-down control module 5 are connected to a second clock signal terminal CKB, the first node P1 and the second node P2 respectively. The pull-down control module 5 is configured to provide a signal of the second clock signal terminal CKB to the second node P2 under the control of the second clock signal terminal CKB, control the potential of the second node P2 as a second potential when the potential of the first node P1 is the first potential, and control the potential of the first node P1 as the second potential when the potential of the second node is the first potential.

A first input terminal of the touch signal output module 6 is connected to the control signal output terminal OUT, a second input terminal thereof is connected to a high frequency signal terminal TH, and a third input terminal thereof is connected to a common voltage signal terminal Vcom. The touch signal output module 6 is used to output a high frequency signal or a common voltage signal to the touch signal output terminal TX under the control of the control signal output terminal OUT;

When an active pulse signal of the input signal terminal Input is a high potential signal, the first potential is a high potential, and the second potential is a low potential; when the active pulse signal of the input signal terminal is a low potential signal, the first potential is a low potential, and the second potential is a high potential; and when the input signal terminal Input starts to output an active pulse signal, the first clock signal terminal CK and the second clock signal terminal CKB output a first potential signal alternatively.

The touch circuit provided in the embodiment of the present disclosure comprises: the input module, the reset module, the pull-up module, the pull-down module, the pull-down control module and the touch signal output module; wherein the input module is configured to provide a signal of the first reference signal terminal to the first node under the control of the input signal terminal; the reset module is configured to provide a signal of the second reference signal terminal to the first node under the control of the reset signal terminal; the pull-up module is configured to provide a signal of the first clock signal terminal to the control signal output terminal when a potential of the first node is a first potential; the pull-down module is configured to provide a signal of the third reference signal terminal to the control signal output terminal when a potential of the second node is the first potential; the pull-down control module is configured to provide a signal of the second clock signal terminal to the second node under the control of the second clock signal terminal, control the potential of the second node as a second potential when the potential of the first node is the first potential, and control the potential of the first node as the second potential when the potential of the second node is the first potential; and the touch signal output module is configured to output a high frequency signal or a common voltage signal to a touch signal output terminal under the control of the control signal output terminal. In this way, the function that the touch circuit outputs the touch signal is realized. Compared with touch circuit formed by adopting more thin film transistors to construct a transmission gate in the prior art, an inverter and a tri-state gate, the touch circuit provided in the embodiments of the present disclosure has a simple structure, and relatively low power consumption.

When implementing specifically, in the touch circuit provided in the embodiment of the present disclosure, when the active pulse signal of the input signal terminal Input is the high potential signal, the signal of the first reference signal terminal is a high potential, and signals of the second reference signal terminal and the third reference signal terminal are both a low potential; when the active pulse signal of the input signal terminal Input is a low potential signal, the signal of the first reference signal terminal is a low potential, and signals of the second reference signal terminal and the third reference signal terminal are both a high potential.

The present disclosure will be described in detail by combining with embodiments. It should be noted that these embodiments of the present disclosure are used to explain the present invention to the better, but not used to limit the protection scope of the present invention.

Figure 3A:
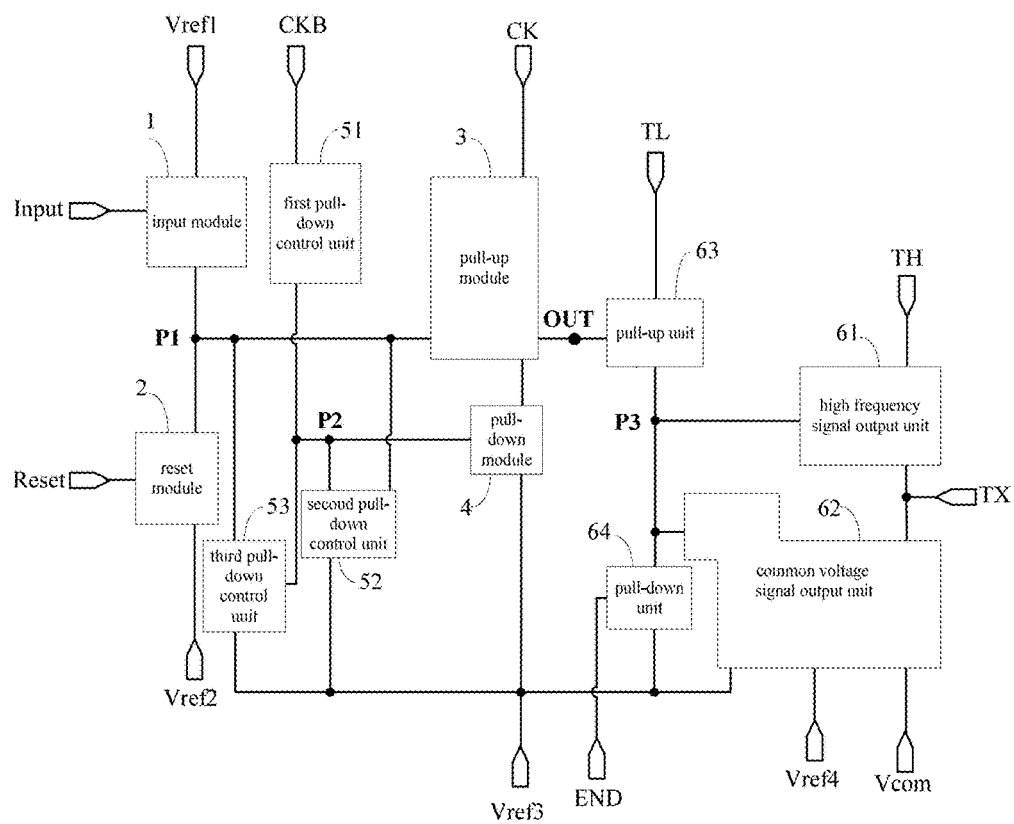
FIG. 3a is a schematic diagram of a structure of a touch circuit provided in another embodiment of the present disclosure.

FIG. 3*a* shows a schematic diagram of a structure of a touch circuit provided in another embodiment of the present disclosure. In the touch circuit, as shown in FIG. 3*a*, the pull-down control module 5 can comprise: a first pull-down control unit 51, a second pull-down control unit 52 and a third pull-down control unit 53.

In FIG. 3*a*, a control terminal and an input terminal of the first pull-down control unit 51 are both connected to the second clock signal terminal CKB, and an output terminal thereof is connected to the second node P2. The first pull-down control unit 51 is configured to provide the signal of the second clock signal terminal CKB to the second node P2 under the control of the second clock signal terminal CKB.

A control terminal of the second pull-down control unit 52 is connected to the first node P1, an input terminal thereof is connected to a third reference signal terminal Vref3, and an output terminal thereof is connected to the second node P2. The second pull-down control unit 52 is configured to provide a signal of the third reference signal terminal Vref3 to the second node P2 when the potential of the first node P1 is the first potential.

A control terminal of the third pull-down control unit 53 is connected to the second node P2, an input terminal thereof is connected to the third reference signal terminal Vre3, and an output terminal thereof is connected to the first node P1. The third pull-down control unit 53 is configured to provide the signal of the third signal terminal Vref3 to the first node P1 when the potential of the second node P2 is the first potential.

When implementing specifically, in the touch circuit provided in the embodiment of the present disclosure, when the potential of the first node is the first potential, the second pull-down control unit provides the signal of the third reference signal terminal to the second node, such that the potential of the second node is the second potential; and the first pull-down control unit provides the signal of the second clock signal terminal to the second node when the signal of the second clock signal terminal is the first potential, such that the potential of the second node is the first potential; when the potential of the second node is the first potential, the third pull-down control unit provides the signal of the third reference signal terminal to the first node, such that the potential of the first node is the second potential, thereby realizing that the potential of only one node of the first node and the second node is the first potential at a same moment, and thus ensuring normal and stable output of the control signal output terminal.

Figure 3B:
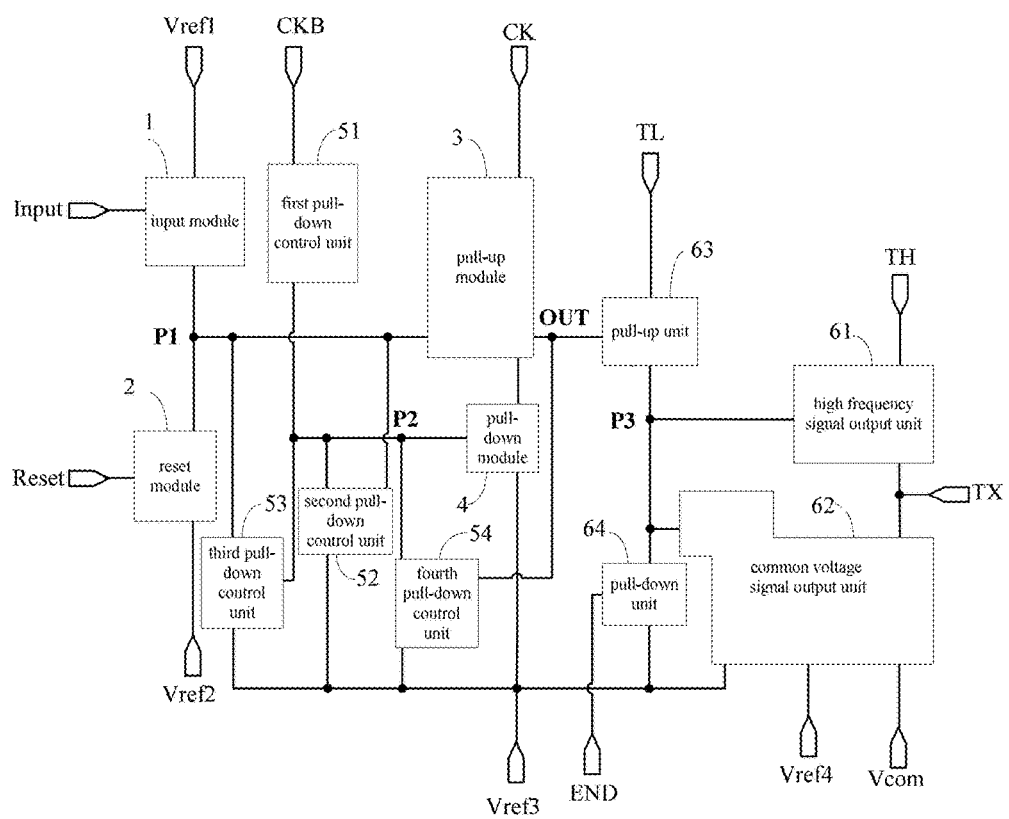
FIG. 3b is a schematic diagram of a structure of a touch circuit provided in another embodiment of the present disclosure.

FIG. 3b shows a schematic diagram of a structure of a touch circuit provided in yet another embodiment of the present disclosure. As shown in FIG. 3b, further, in the touch circuit provided in the embodiment of the present disclosure, the pull-down control module 5 can further comprise: a fourth pull-down control unit 54.

In FIG. 3b, a control terminal of the fourth pull-down control unit 54 is connected to the control signal output terminal OUT, an input terminal thereof is connected to the third reference signal terminal Vref3, and an output terminal thereof is connected to the second node P2. The fourth pull-down control unit 54 is configured to provide the signal of the third reference signal terminal Vref3 to the second node P2 when the potential of the control signal output terminal OUT is the first potential, thereby further ensuring stability of the signal of the control signal output terminal.

Figure 4A:
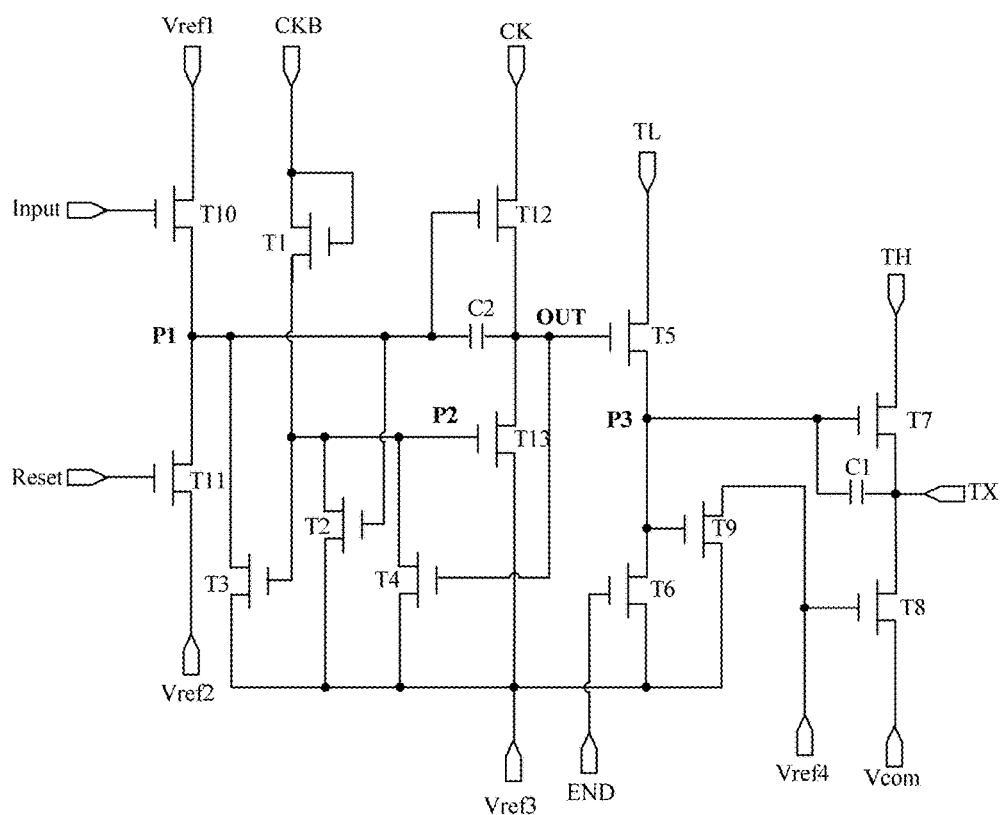
FIG. 4a is a schematic diagram of a specific circuit structure of a touch circuit provided in an embodiment of the present disclosure.
Figure 4B:
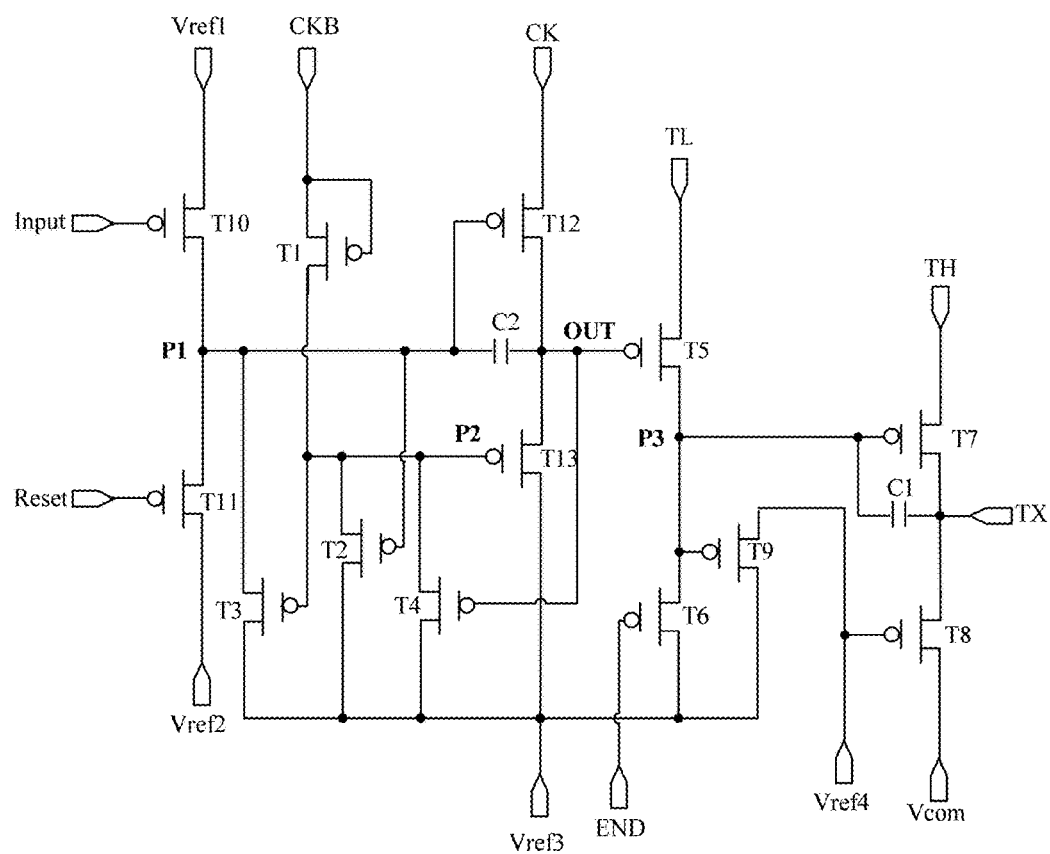
FIG. 4b is a schematic diagram of another specific circuit structure of a touch circuit provided in an embodiment of the present disclosure.

FIGS. 4a and 4b show schematic diagrams of a specific circuit structure of a touch circuit provided in an embodiment of the present disclosure respectively. Exemplarily, as shown in FIGS. 4a and 4b, in the touch circuit provided in the embodiment of the present disclosure, the first pull-down control unit 51 can comprise: a first switch transistor T1.

Both a gate and a source of the first switch transistor T1 are connected to the second clock signal terminal CKB, and a drain thereof is connected to the first node P1.

In the touch circuit provided in the embodiment of the present disclosure, when the first switch transistor is in a turn-on state under the control of the second clock signal terminal, the signal of the second clock signal terminal is provided to the first node.

Further, when implementing specifically, in the touch circuit provided in the embodiments of the present disclosure, as shown in FIG. 4a, when the active pulse signal of the input signal terminal Input is a high potential signal, the first switch transistor T1 is a N-type transistor. Or, as shown in FIG. 4b, when the active pulse signal of the input signal terminal Input is a low potential signal, the first switch transistor T1 is a P-type transistor.

Specifically, the N-type transistor is in the turn-on state when its gate potential is a high potential, and is in a turn-off state when its gate potential is a low potential; the P-type transistor is in the turn-on state when its gate potential is a low potential, and is in a turn-off state when its gate potential is a high potential.

The above description just takes an example to describe the specific structure of the first pull-down control unit in the touch circuit. When implementing specifically, the specific structure of the first pull-down control unit is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the second pull-down control unit 52 can comprise: a second switch transistor T2.

A gate of the second switch transistor T2 is connected to the first node P1, a source thereof is connected to the third reference signal terminal Vref3, and a drain thereof is connected to the second node P2.

In particular, in the touch circuit provided in the embodiment of the present disclosure, when the second switch transistor is in the turn-on state under the control of the first node, the signal of the third reference signal terminal is provided to the second node.

Further, when implementing specifically, in the touch circuit provided in the embodiment of the present disclosure, as shown in FIG. 4a, when the active pulse signal of the input signal terminal Input is a high potential signal, the second switch transistor T2 is the N-type transistor. Or, as shown in FIG. 4b, when the active pulse signal of the input signal input Input is a low potential signal, the second switch transistor T2 is the P-type transistor.

The above description just takes an example to describe the specific structure of the second pull-down control unit in the touch circuit. When implementing specifically, the specific structure of the second pull-down control unit is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the third pull-down control unit 53 can comprise: a third switch transistor T3.

A gate of the second switch transistor T3 is connected to the second node P2, a source thereof is connected to the third reference signal terminal Vref3, and a drain thereof is connected to the first node P1.

In particular, in the touch circuit provided in the embodiment of the present disclosure, when the third switch transistor is in the turn-on state under the control of the second node, the signal of the third reference signal terminal is provided to the first node.

Further, when implementing specifically, in the touch circuit provided in the embodiment of the present disclosure, as shown in FIG. 4a, when the active pulse signal of the input signal terminal Input is a high potential signal, the third switch transistor T3 is the N-type transistor. Or, as shown in FIG. 4b, when the active pulse signal of the input signal input Input is a low potential signal, the third switch transistor T3 is the P-type transistor.

The above description just takes an example to describe the specific structure of the third pull-down control unit in the touch circuit. When implementing specifically, the specific structure of the third pull-down control unit is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the fourth pull-down control unit 54 can comprise: a fourth switch transistor T4.

A gate of the fourth switch transistor T4 is connected to the control signal output terminal OUT, a source thereof is connected to the third reference signal terminal Vref3, and a drain thereof is connected to the second node P2.

In particular, in the touch circuit provided in the embodiment of the present disclosure, when the fourth switch transistor is in the turn-on state under the control of the control signal output terminal, the signal of the third reference signal terminal is provided to the second node.

Further, when implementing specifically, in the touch circuit provided in the embodiment of the present disclosure, as shown in FIG. 4a, when the active pulse signal of the input signal terminal Input is a high potential signal, the fourth switch transistor T4 is the N-type transistor. Or, as shown in FIG. 4b, when the active pulse signal of the input signal input Input is a low potential signal, the fourth switch transistor T4 is the P-type transistor.

The above description just takes an example to describe the specific structure of the fourth pull-down control unit in the touch circuit. When implementing specifically, the specific structure of the fourth pull-down control unit is not limited to the above structure provided in the embodiment of the present disclosure, and may be other structures known by those skilled in the art, to which no limitation is given herein.

In specific implementation, in the touch circuit provided in the embodiment of the present disclosure, as shown in FIG. 3a, the touch signal output module 6 can comprise: a high frequency signal output unit 61, a common voltage signal output unit 62, a pull-up unit 63 and a pull-down unit 64.

A control terminal of the pull-up unit 63 is a first input terminal of the touch signal output module 6, an input terminal thereof is connected to a low frequency signal terminal TL, and an output terminal thereof is connected to a third node P3; the pull-up unit 63 is configured to provide a signal of the low frequency signal terminal TL to the third node P3 when the potential of the control signal output terminal OUT is the first potential.

A control terminal of the pull-down unit 64 is connected to an end signal terminal END, an input terminal thereof is connected to the third node P3, and an output terminal thereof is connected to the third reference signal terminal Vref3. The pull-down unit 64 is configured to provide the signal of the third reference signal terminal Vref3 to the third node P3 under the control of the end signal terminal END.

A control terminal of the high frequency signal output terminal 61 is connected to the third node P3, an input terminal thereof is connected to a second input terminal of the touch signal output module 6, and an output terminal thereof is connected to a touch signal output terminal TX. The high frequency signal output unit 61 is configured to control the touch signal output terminal TX to output a high frequency signal when the potential of the third node P3 is the first potential.

The common voltage signal output unit 62 is connected among the third node P3, the third reference signal terminal Vref3, a fourth reference signal terminal Vref4, the common voltage signal terminal Vcom, and the touch signal output terminal TX. The common voltage signal output terminal 62 is configured to control the touch signal output terminal TX to output a common voltage signal when the potential of the third node P3 is the second potential.

Further, in the touch circuit provided in the embodiment of the present disclosure, when a signal of the third reference signal terminal is a high potential, the signal of the fourth reference signal terminal is a low potential; when the signal of the third reference signal terminal is a low potential, the signal of the fourth reference signal is a high potential.

In particular, in the touch circuit provided in the embodiment of the present disclosure, when the potential of the control signal output terminal is the first potential, the pull-up unit provides the signal of the low frequency signal terminal to the third node. When the signal of the end signal terminal is the first potential, the pull-down unit provides the signal of the third reference signal terminal to the third node. When the potential of is the third node is the first potential, the high frequency signal output unit controls the touch signal output terminal to output a high frequency signal; when the potential of the third node is the second potential, the common voltage signal output unit controls the touch signal output terminal to output a common voltage signal. In this way, the function that the touch signal output module selects to output the high frequency signal or the common voltage signal under the control of the control signal output terminal is realized.

It should be noted that in the touch circuit provided in the embodiment of the present disclosure, a pulse width of the low frequency signal inputted by the low frequency signal terminal is at least two times of a pulse width of the high frequency inputted by the high frequency signal terminal. When the touch signal output terminal outputs the high frequency signal, the pulse width of the low frequency signal inputted by the low frequency signal terminal makes a sample selection of the high frequency signal outputted by the touch signal output terminal, which determines how many high frequency signals outputted at each time when the touch signal output terminal outputs the high frequency signal. For example, if the pulse width of the low frequency signal is two times of the pulse width of the high frequency signal, then two high frequency signals are outputted at each time when the touch signal output terminal TX outputs the high frequency signal.

Exemplarily, in the touch circuit provided in the embodiment of the present disclosure, as shown in FIGS. 4a and 4b, the pull-up unit 63 can comprise: a fifth switch transistor T5.

A gate of the fifth switch transistor T5 is connected to the control signal output terminal OUT, a source thereof is connected to the low frequency signal terminal TL, and a drain thereof is connected to the third node P3.

In the touch circuit provided in the embodiment of the present disclosure, when the fifth switch transistor T5 is in the turn-on state under the control of the control signal output terminal, the signal of the low frequency terminal is provided to the third node P3.

Further, when implementing specifically, in the touch circuit provided in the embodiment of the present disclosure, as shown in FIG. 4a, when the active pulse signal of the input signal terminal Input is a high potential signal, the fifth switch transistor T5 is a N-type transistor. Or, as shown in FIG. 4b, when the active pulse signal of the input signal terminal Input is a low potential signal, the fifth switch transistor T5 is a P-type transistor.

The above description just takes an example to describe the specific structure of the pull-up unit in the touch circuit. When implementing specifically, the specific structure of the pull-up unit is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the pull-down unit 64 can comprise: a sixth switch transistor T6.

A gate of the sixth switch transistor T6 is connected to the end signal terminal END, a source thereof is connected to the third reference signal terminal Vref3, and a drain thereof is connected to the third node P3.

In the touch circuit provided in the embodiment of the present disclosure, when the sixth switch transistor T6 is in the turn-on state under the control of the end signal terminal END, the signal of the third reference signal terminal Vref3 is provided to the third node P3.

Further, when implementing specifically, in the touch circuit provided in the embodiment of the present disclosure, as shown in FIG. 4a, when the active pulse signal of the input signal terminal Input is a high potential signal, the sixth switch transistor T6 is the N-type transistor. Or, as shown in FIG. 4b, when the active pulse signal of the input signal input Input is a low potential signal, the sixth switch transistor T6 is the P-type transistor.

The above description just takes an example to describe the specific structure of the pull-down unit in the touch circuit. When implementing specifically, the specific structure of the pull-down unit is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the high frequency signal output unit 61 can comprise: a seventh switch transistor T7 and a first capacitor C1.

A gate of the seventh switch transistor T7 is connected to the third node P3, a source thereof is connected to the high frequency signal terminal TH, and a drain thereof is connected to the touch signal output terminal TX.

The first capacitor C1 is connected between the gate and drain of the seventh switch transistor T7.

In the touch circuit provided in the embodiment of the present disclosure, when the seventh switch transistor is in the turn-on state under the control of the third node P3, the signal of the high frequency signal terminal TH is provided to the touch signal output terminal TX, so that the touch signal output terminal TX outputs the high frequency signal.

Further, when implementing specifically, in the touch circuit provided in the embodiment of the present disclosure, as shown in FIG. 4a, when the active pulse signal of the input signal terminal Input is a high potential signal, the seventh switch transistor T7 is the N-type transistor. Or, as shown in FIG. 4b, when the active pulse signal of the input signal input Input is a low potential signal, the seventh switch transistor T7 is the P-type transistor.

The above description just takes an example to describe the specific structure of the high frequency signal output unit in the touch circuit. When implementing specifically, the specific structure of the high frequency signal output unit is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the common voltage signal output unit 62 can comprise: an eighth switch transistor T8 and a ninth switch transistor T9.

A gate of the eighth switch transistor T8 is connected to the fourth reference signal terminal Vref4, a source thereof is connected to the common voltage signal terminal Vcom, and a drain thereof is connected to the touch signal output terminal TX;

A gate of ninth switch transistor T9 is connected to the third node P3, a source thereof is connected to the third reference signal terminal Vref3, and a drain thereof is connected to the fourth reference signal terminal Vref4.

In the touch circuit provided in the embodiment of the present disclosure, when the potential of the third node is the first potential, the ninth switch transistor T9 is in the turn-on state, the turned on ninth switch transistor T9 connects the gate of the eighth switch transistor T8 with the third reference signal terminal Vref3, such that the eighth switch transistor T8 is turned off, and the ninth switch transistor T9 has a relatively large size, which would increase its function of voltage dividing, and would pull down the gate voltage of the eighth switch transistor T8 to the better, so as to ensure that the eighth switch transistor T8 is in a complete turn-off state. When the potential of the third node P3 is the second potential, the ninth switch transistor T9 is in the turn-off state. Since the gate of the eight switch transistor T8 is connected to the fourth reference signal terminal, the eighth switch transistor T8 is in the turn-on state. The turned on eighth switch transistor T8 connects the common voltage signal terminal with the touch signal output terminal, so that the touch signal output terminal outputs the common voltage signal.

Further, when implementing specifically, in the touch circuit provided in the embodiment of the present disclosure, as shown in FIG. 4a, when the active pulse signal of the input signal terminal Input is a high potential signal, the eighth switch transistor T8 and the ninth switch transistor T9 are N-type transistors. Or, as shown in FIG. 4b, when the active pulse signal of the input signal input Input is a low potential signal, the eighth switch transistor T8 and the ninth switch transistor T9 are the P-type transistors.

Figure 5A:
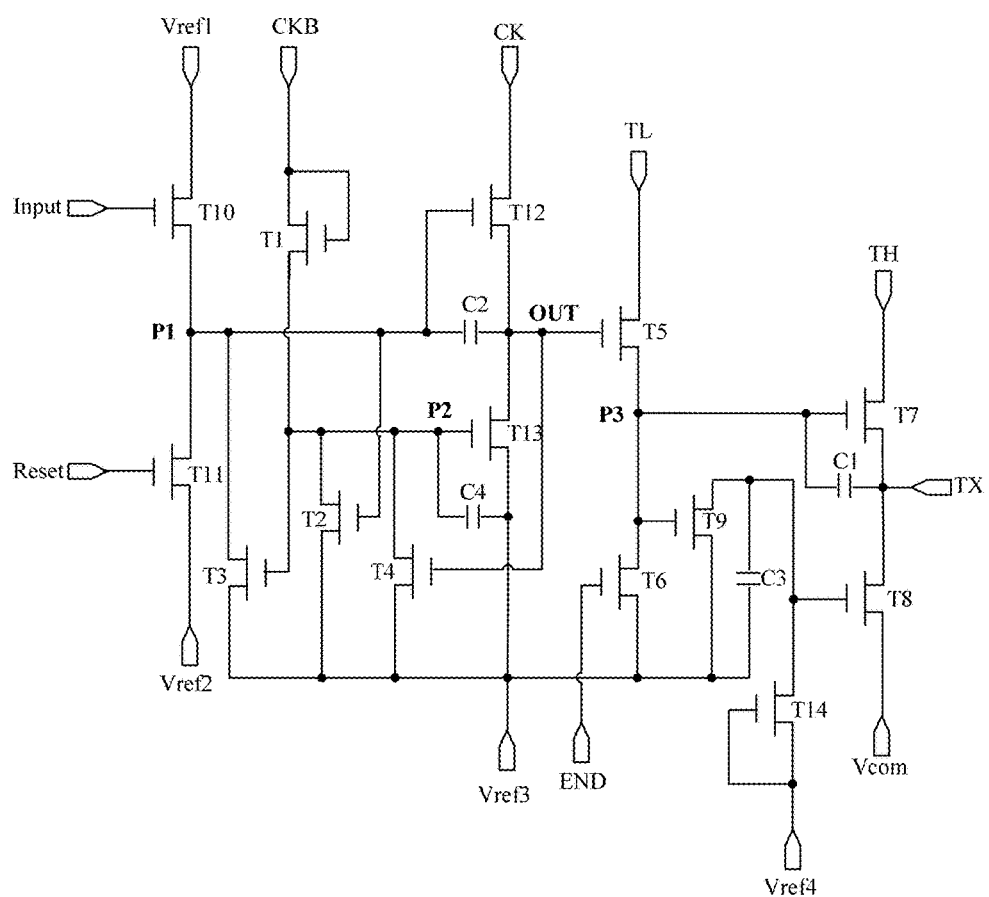
FIG. 5a is a schematic diagram of another specific circuit structure of a touch circuit provided in an embodiment of the present disclosure.
Figure 5B:
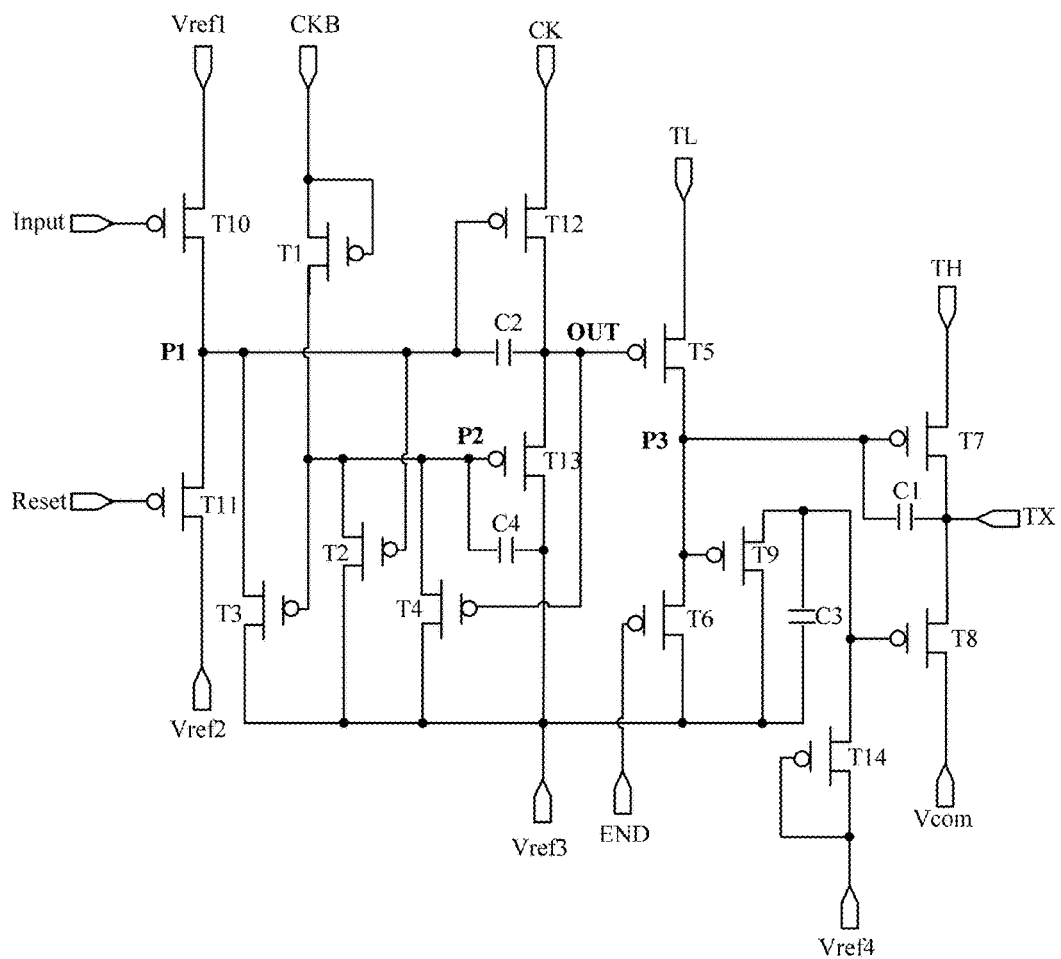
FIG. 5b is a schematic diagram of another specific circuit structure of a touch circuit provided in an embodiment of the present disclosure.

Further, in the touch circuit provided in the embodiment of the present disclosure, as shown in FIGS. 5a and 5b, the common voltage signal output unit 62 can further comprise: a third capacitor C3, which is connected between the gate and drain of the eighth switch transistor T8. Herein, the third capacitor C3 mainly functions as filtering and voltage stabilizing, so as to ensure stability of the touch signal output terminal.

Further, in the touch circuit provided in the embodiment of the present disclosure, as shown in FIGS. 5a and 5b, the common voltage signal output terminal 62 can further comprise: s fourteenth switch transistor T14.

Both a gate and a source of the fourteenth switch transistor T14 are connected to the fourth reference signal terminal Vref4, and a drain thereof is connected to the gate of the eighth switch transistor T8 and the drain of the ninth switch transistor T9 respectively.

In particular, in the touch circuit provided in the embodiment of the present disclosure, the fourteenth switch transistor T14 connects the fourth reference signal terminal Vref4 to the gate of the eighth switch transistor T8 and the drain of the ninth switch transistor T9 in a diode connecting manner, and is always in a normal turn-on state. When the ninth switch transistor T9 is in the turn-off state, the signal inputted by the fourth reference signal terminal Vref4 is provided to the gate of the eighth switch transistor T8, so that the eighth switch transistor T8 is in the turn-on state. The turned on eighth switch transistor T8 connects the common voltage signal terminal Vcom with the touch signal output terminal TX, so that the touch signal output terminal TX outputs the common voltage signal.

Further, when implementing specifically, in the touch circuit provided in the embodiment of the present disclosure, as shown in FIG. 5a, when the active pulse signal of the input signal terminal Input is a high potential signal, the fourteenth switch transistor T14 is a N-type transistor. Or, as shown in FIG. 5b, when the active pulse signal of the input signal terminal Input is a low potential signal, the fourteenth switch transistor T14 is a P-type transistor.

The above description just takes an example to describe the specific structure of the common voltage signal output unit in the touch circuit. When implementing specifically, the specific structure of the common voltage signal output unit is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the input module 1 can comprise: a tenth switch transistor T10.

A gate of the tenth switch transistor T10 is connected to the input signal terminal Input, a source thereof is connected to the first reference signal terminal Vref1, and a drain thereof is connected to the first node P1.

In the touch circuit provided in the embodiment of the present disclosure, when the tenth switch transistor T10 is in the turn-on state under the control of the input signal terminal, the signal of the first reference signal terminal Vref1 is provided to the first node P1.

Further, when implementing specifically, in the touch circuit provided in the embodiment of the present disclosure, as shown in FIG. 4a, when the active pulse signal of the input signal terminal Input is a high potential signal, the tenth switch transistor T10 is the N-type transistor. Or, as shown in FIG. 4b, when the active pulse signal of the input signal input Input is a low potential signal, the tenth switch transistor T10 is the P-type transistor.

The above description just takes an example to describe the specific structure of the input module in the touch circuit. When implementing specifically, the specific structure of the input module is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the reset module 2 can comprise: an eleventh switch transistor T11.

A gate of the eleventh switch transistor T11 is connected to the reset signal terminal Reset, a source thereof is connected to the second reference signal terminal Vref2, and a drain thereof is connected to the first node P1.

In the touch circuit provided in the embodiment of the present disclosure, when the eleventh switch transistor T11 is in the turn-on state under the control of the reset signal terminal, the signal of the second reference signal terminal is provided to the first node.

Further, when implementing specifically, in the touch circuit provided in the embodiment of the present disclosure, as shown in FIG. 4a, when the active pulse signal of the input signal terminal Input is a high potential signal, the eleventh switch transistor T11 is the N-type transistor. Or, as shown in FIG. 4b, when the active pulse signal of the input signal input Input is a low potential signal, the eleventh switch transistor T11 is the P-type transistor.

The above description just takes an example to describe the specific structure of the reset module in the touch circuit. When implementing specifically, the specific structure of the reset module is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the pull-up module 3 can comprise: a twelfth switch transistor T12 and a second capacitor C2.

A gate of the twelfth switch transistor T12 is connected to the first node P1, a source thereof is connected to the first clock signal terminal CK, and a drain thereof is connected to the control signal output terminal OUT.

The second capacitor C2 is connected between the gate and drain of the twelfth switch transistor T12.

In the touch circuit provided in the embodiment of the present disclosure, when the twelfth switch transistor T12 is in the turn-on state under the control of the first node P1, the signal of the first clock signal terminal is provided to the control signal terminal.

Further, when implementing specifically, in the touch circuit provided in the embodiment of the present disclosure, as shown in FIG. 4a, when the active pulse signal of the input signal terminal Input is a high potential signal, the twelfth switch transistor T12 is the N-type transistor. Or, as shown in FIG. 4b, when the active pulse signal of the input signal input Input is a low potential signal, the twelfth switch transistor T12 is the P-type transistor.

The above description just takes an example to describe the specific structure of the pull-up module in the touch circuit. When implementing specifically, the specific structure of the pull-up module is not limited to the above structure provided in the embodiment of the present disclosure, and may be other structures known by those skilled in the art, to which no limitation is given herein.

Exemplarily, in the touch circuit provided in the embodiment of the present disclosure, as shown in FIGS. 4a and 4b, the pull-down module 4 can comprise: a thirteenth switch transistor T13.

A gate of the thirteenth switch transistor T13 is connected to the second node P2, a source thereof is connected to the third reference signal terminal Vref3, and a drain thereof is connected to the control signal output terminal OUT.

In the touch circuit provided in the embodiment of the present disclosure, when the thirteenth switch transistor T13 is in the turn-on state under the control of the second node P2, the signal of the third reference signal terminal Vref3 is provided to the control signal output terminal.

Further, when implementing specifically, in the touch circuit provided in the embodiment of the present disclosure, as shown in FIG. 4a, when the active pulse signal of the input signal terminal Input is a high potential signal, the thirteenth switch transistor T13 is the N-type transistor. Or, as shown in FIG. 4b, when the active pulse signal of the input signal input Input is a low potential signal, the thirteenth switch transistor T13 is the P-type transistor.

Further, as shown in FIGS. 5a and 5b, in the touch circuit provided in the embodiment of the present disclosure, the pull-down module 4 can further comprise: a fourth capacitor C4, which is connected between the gate and drain of the thirteenth switch transistor 113. Herein, the fourth capacitor C4 mainly functions as filtering and voltage stabilizing, so as to ensure stability of the touch signal output terminal.

The above description just takes an example to describe the specific structure of the pull-clown module in the touch circuit. When implementing specifically, the specific structure of the pull-down module is not limited to the above structure provided in the embodiment of the present disclosure, and may be other structures known by those skilled in the art, to which no limitation is given herein.

It should be noted that the switch transistors mentioned in the embodiments of the present disclosure may be thin film transistors (TFT), or may be metal oxide semiconductor (MOS), to which no limitation is given herein. In a specific implementation, functions of sources and drains of these switch transistors can be exchanged with each other depending on different types of transistors and input signals, to which no distinction is made herein.

In the touch circuit provided in the embodiment of the present disclosure, as shown in FIGS. 4a and 5a, when the active pulse signal of the input signal is a high potential signal, all the switch transistors are N-type transistors; as shown in FIGS. 4b and 5b, when the active pulse signal of the input signal is a low potential signal, all the switch transistors are P-type transistors. In this way, an integrated touch circuit design with a single transistor structure is provided. Compared with the touch circuit constituted of the N-type transistors and the P-type transistors in the prior art, the touch circuits provided in the embodiments of the present disclosure have high development reliability, simple structure, and few number of switch transistors, which saves space for the design, and is more advantageous for a narrow frame of a display product.

In the touch circuit provided in the embodiment of the present disclosure, since all the respective modules can be constituted of N-type thin film transistors, i.e., totally fourteenth NMOS transistors and four capacitors are needed to form the touch circuit, they match with the N-type thin film transistor driving circuit used to drive the display panel to realize the display function in the display panel in a better way. Compared with the touch circuit formed by adopting more thin film transistors to construct transmission gates, inverters and tri-state gate circuits in the prior art, the touch circuit provided in the embodiments of the present disclosure adopts less number of N-type thin film transistors. Therefore, the touch circuits provided in the embodiments of the present disclosure have simple structure and low power consumption.

Based on the same inventive concept, there is provided in an embodiment of the present disclosure a touch panel, comprising a plurality of touch circuits connected in cascades provided in an embodiment of the present disclosure.

In the touch panel, except a first stage of touch circuit, control signal output terminals of other stages of touch circuits are connected to a reset signal terminal of an adjacent previous stage of touch circuit; and except a last stage of touch circuit, control signal output terminals of other stages of touch circuits are connected to a signal input terminal of an adjacent next stage of touch circuit.

Figure 6A:
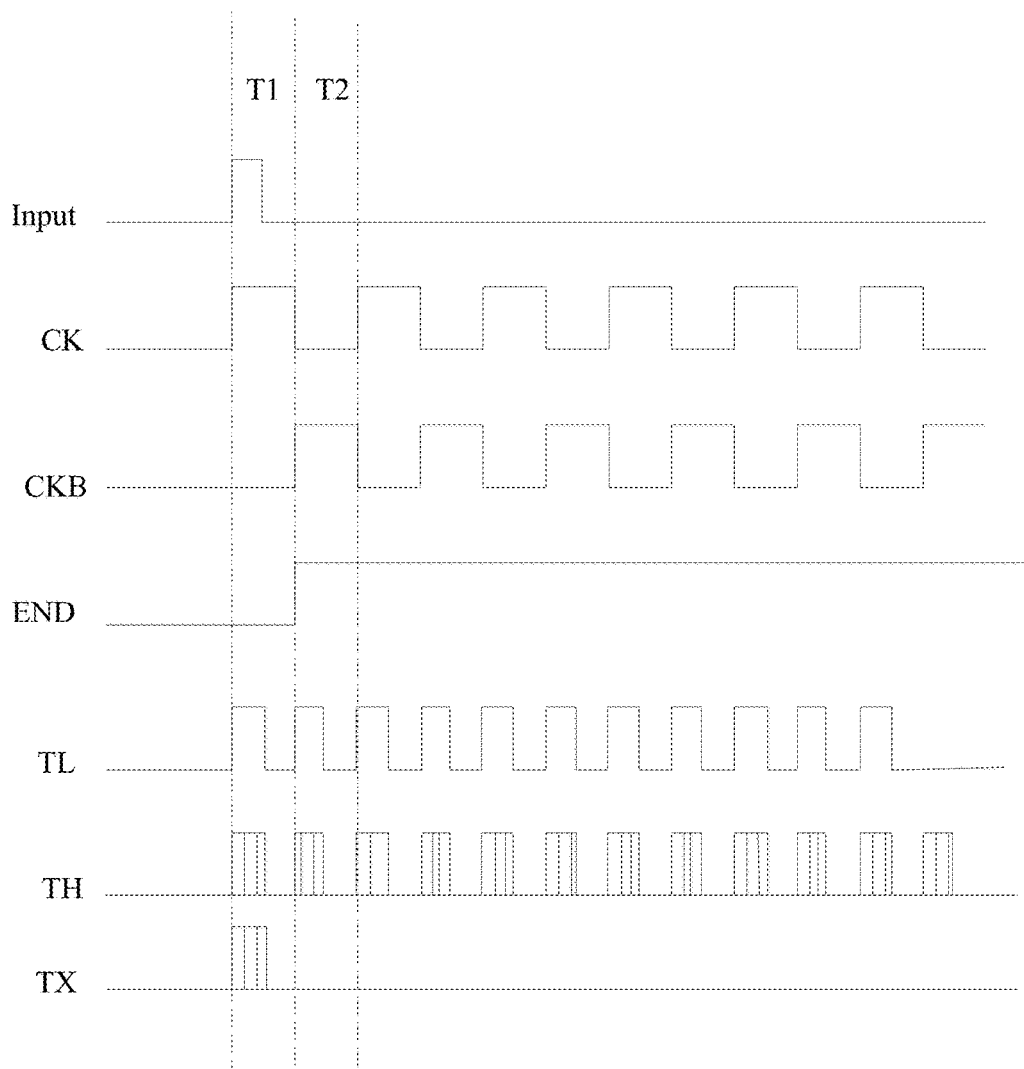
Figure 6B:
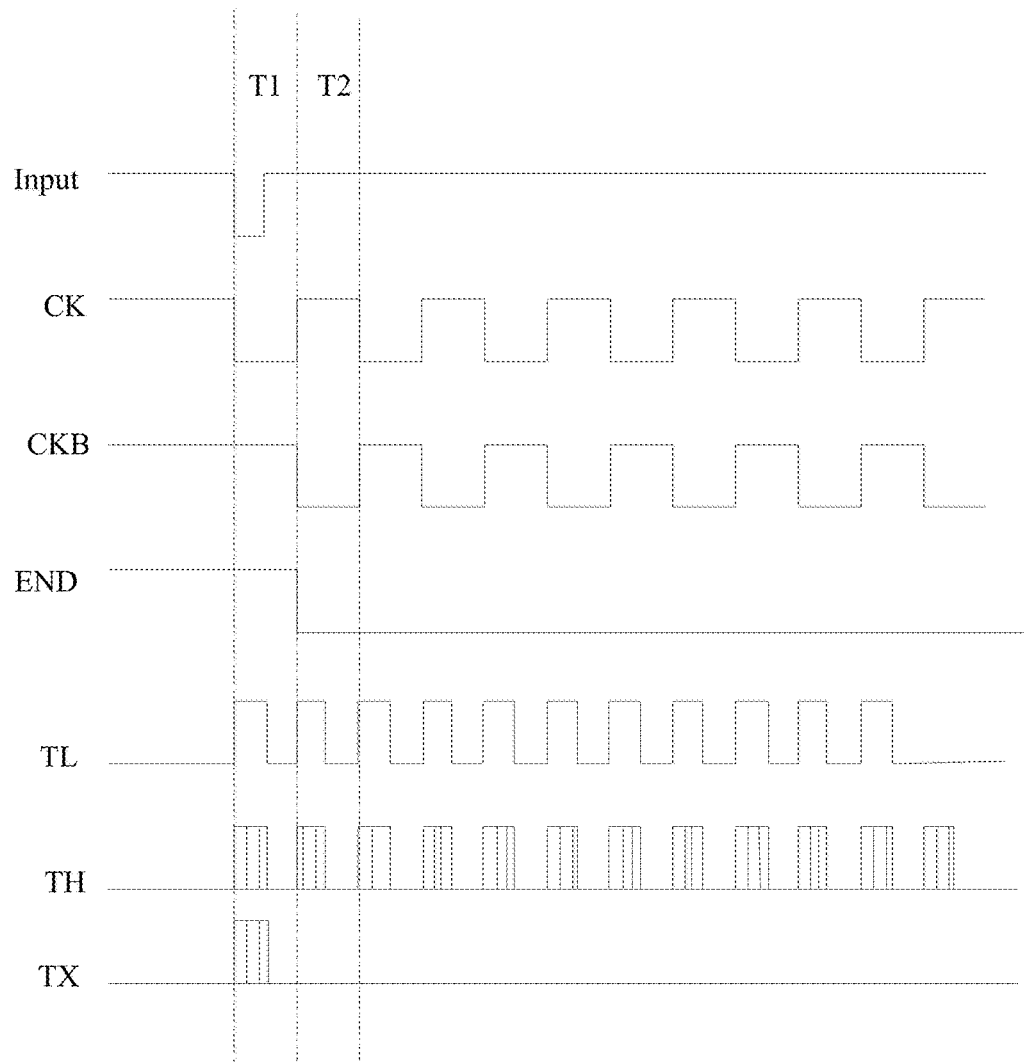
FIG. 6b is a schematic diagram of an operation timing of the touch circuit as shown in FIG. 5b.

FIG. 6a shows a schematic diagram of an operation timing of the touch circuit as shown in FIG. 5a, and FIG. 6b shows a schematic diagram of an operation timing of the touch circuit as shown in FIG. 5b Operation process of the touch circuit will be described in detail in combination with FIGS. 6a, 6b and 7 by taking respectively the touch circuits as shown in FIGS. 4a to 5b as an example. The description below uses 1 to represent a high potential signal, and uses 0 to represent a low level signal.

In the touch circuit as shown in FIG. 5a, the active pulse signal of the input signal terminal Input is a high potential signal, a first potential is a high potential, a second potential is a low potential, signals of the first reference signal terminal Vref1 and the fourth reference signal terminal Vref4 are the high potential, signals of the second reference signal terminal Vref1 and the third reference signal terminal Vref1 are the low potential, all the switch transistors are N-type transistors, and the corresponding input/output timing diagrams are shown in FIG. 6a. In particular, phases T1 and T2 in the input/output timing diagram as shown in FIG. 6a are selected.

In phase T1, Input=1, T1=1, CK=1, CKB=0, Reset=0, END=0. Since Input=1, the tenth switch transistor T10 is turned on. The turned on tenth switch transistor T10 provides the signal of the first reference signal terminal Vref1 having the high potential to the first node P1. Therefore, the potential of the first node P1 is the high potential, so that the twelfth switch transistor T12 and the second switch transistor T2 are turned on. The turned on second switch transistor T2 provides the signal of the third reference signal terminal Vref3 having the low potential to the second node P2. Therefore, the potential of the second node P2 is the low potential, so that the third switch transistor T3 and the thirteenth switch transistor T13 are turned off. The turned on twelfth switch transistor T12 connects the first clock signal terminal CK to the control signal output terminal OUT. Since CK=1, the potential of the control signal output terminal OUT is the high potential, so that the fifth switch transistor T5 and the fourth switch transistor T4 are in the turn-on state. The turned on fourth switch transistor T4 connects the third reference signal terminal Vref3 having the low potential to the second node P2, thereby further ensuring that the potential of the second node P2 is the low potential, and the turned on fifth switch transistor T5 connects the low frequency signal terminal TL with the third node P3. Since TL=1, the potential of the third node P3 is the high potential, so that the ninth switch transistor T9 and the seventh switch transistor T7 are in the turn-on state. The turned on ninth switch transistor T9 connects the third reference signal terminal Vref3 having the low potential to the gate of the eighth switch transistor T8 and the drain of the fourteenth switch transistor T14. Therefore, the eighth switch transistor T8 is turned off, and the turned on seventh switch transistor T7 connects the high frequency signal terminal TH to the touch signal output terminal TX, so that the touch signal output terminal TX outputs a high frequency signal according to a pulse width of a low frequency signal inputted by the low frequency signal terminal TL.

That is, the phase T1 is a phase where the touch signal output terminal TX outputs the high frequency signal.

In phase T2, Input=0, TL=1, CK=0, CKB=1, Reset=1, END=1. Since Reset=1, the eleventh switch transistor T11 is turned on. The turned on eleventh switch transistor T1 connects the second reference signal terminal Vref2 having the low potential to the first node P1. Therefore, the potential of the first node P1 is the low potential. Since CKB=1, the first switch transistor T1 is turned on. The turned on first switch transistor T1 connects the second clock signal terminal CKB to the second node P2. Therefore, the potential of the second node P2 becomes the high potential, so that the thirteenth switch transistor T13 and the third switch transistor T3 are turned on. The turned on third switch transistor T3 provides the signal of the third reference signal terminal Vref3 having the low potential to the first node P1, and the turned on thirteen switch transistor T13 connects the control signal output terminal OUT to the third reference signal terminal Vref3 having the low potential. Therefore, the potential of the control signal output terminal OUT is the low potential, so that the fifth switch transistor T5 is turned off. Since END=1, the sixth switch transistor T6 is turned on. The turned on sixth switch transistor T6 provides the signal of the third reference signal terminal Vref3 having the low potential to the third node P3. Therefore, the potential of the third node P3 is the low potential, and the ninth switch transistor T9 and the seventh switch transistor T7 are turned off. Since the fourteenth switch transistor T14 is in a normal turn-on state, and at this time, the ninth switch transistor T9 is in the turn-off state, thus the gate of the eighth switch transistor T8 is connected to the fourth reference signal terminal Vref4 having the high potential through the fourteenth switch transistor T14. Therefore, the eighth switch transistor T8 is turned on. The turned on eighth switch transistor T8 connects the common voltage signal terminal VCOM to the touch signal output terminal TX, so that the touch signal output terminal TX outputs the common voltage signal.

That is, the phase T2 is a phase where the touch signal output terminal TX outputs the common voltage signal.

In subsequent periods of time, the touch signal output terminal would constantly output the common voltage signal until the active pulse signal of the signal input terminal Input is the high potential signal.

Figure 7A:
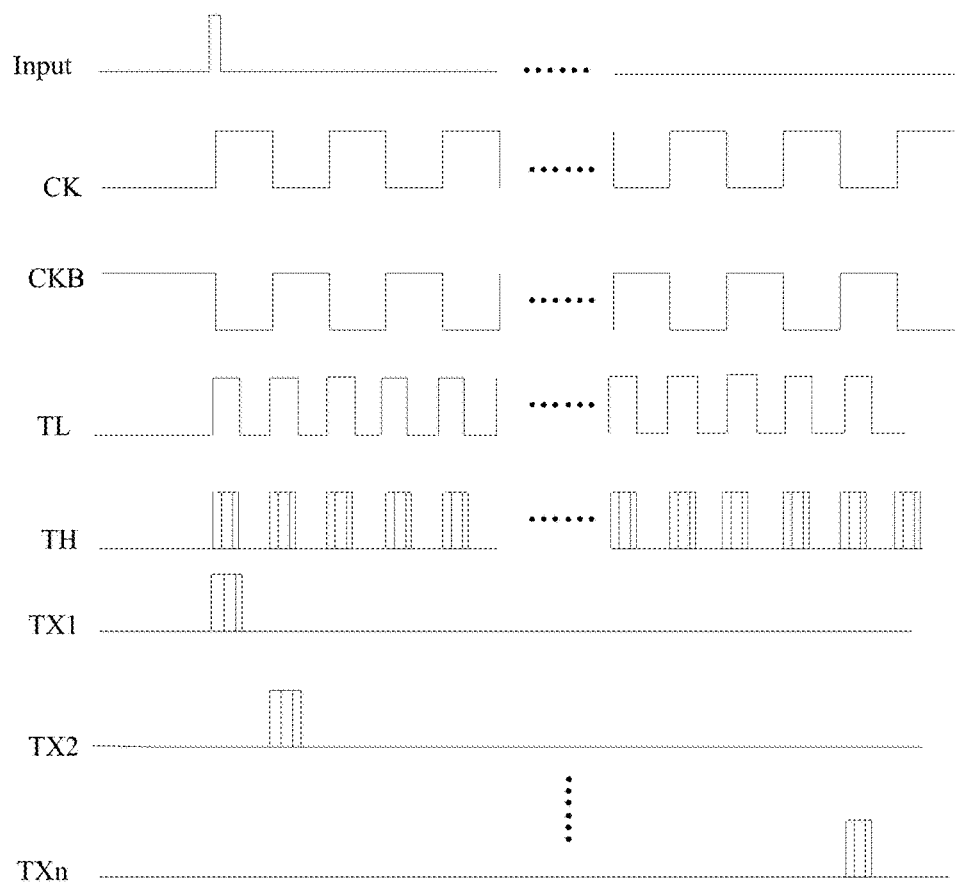
FIGS. 7a and 7b are schematic diagrams of operation timings that touch circuits connected in cascades output touch signals in sequence respectively provided in an embodiment of the present disclosure.

The above process is an operation process that one touch circuit outputs the high frequency signal and the common voltage signal respectively. In the entire touch circuits of the touch panel connected in cascades, under the control of respective signal control terminals, each stage of touch circuit outputs the high frequency signal or the common voltage signal respectively according to the above operation process as shown in FIG. 7a, which finally realizes the function that the touch circuits output the high frequency signal stage by stage, i.e., realizing the process of progressive touch scanning of the touch panel.

In the touch circuit as shown in FIG. 5b, the active pulse signal of the input signal terminal Input is the low potential signal, the first potential is the low potential, the second potential is the high potential, signals of the first reference signal terminal Vref1 and the fourth reference signal terminal Vref4 are the low potential, signals of the second reference signal terminals Vref2 and the third reference signal terminals Vref3 are the high potential, all the switch transistors are N-type transistors, and the corresponding input/output timing diagram is shown in FIG. 6b. In particular, phases T1 and T2 in the input/output timing diagram as shown in FIG. 6b are selected.

In phase T1, Input=0, TL=0, CK=0, CKB=1, Reset=1, END=1. Since Input=0, the tenth switch transistor T10 is turned on. The turned on tenth switch transistor T10 connects the first reference signal terminal Vref1 having the low potential to the first node P1. Therefore, the potential of the first node P1 is the low potential, so that the twelfth switch transistor T12 and the second switch transistor T2 are turned on. The turned on second switch transistor T2 connects the third reference signal terminal Vref3 having the high potential to the second node P2. Therefore, the potential of the second node P2 is the high potential, so that the third switch transistor T3 and the thirteenth switch transistor T13 are turned off. The turned on twelfth switch transistor T12 connects the first clock signal terminal CK to the control signal output terminal OUT. Since CK=0, the potential of the control signal output terminal OUT is the low potential, so that the fifth switch transistor T5 and the fourth switch transistor 14 are in the turn-on state. The turned on fourth switch transistor T4 connects the third reference signal terminal Vref3 having the low potential to the second node P2, thereby further ensuring that the potential of the second node P2 is the high potential, and the turned on fifth switch transistor T5 connects the low frequency signal terminal TL to the third node P3. Since TL=0, the potential of the third node P3 is the low potential, so that the ninth switch transistor 19 and the seventh switch transistor T7 are in the turn-on state. The turned on ninth switch transistor 19 connects the third reference signal terminal Vref3 having the high potential to the gate of the eighth switch transistor T8 and the drain of the fourteenth switch transistor T14. Therefore, the eighth switch transistor T8 is turned off, and the turned on seventh switch transistor T7 connects the high frequency signal terminal TH to the touch signal output terminal TX, so that the touch signal output terminal TX outputs a high frequency signal according to a pulse width of a low frequency signal inputted by the low frequency signal terminal TL.

That is, the phase T1 is a phase where the touch signal output terminal TX outputs the low frequency signal.

In phase T2, Input=1, TL=0, CK=1, CKB=0, Reset=0, END=0. Since Reset=1, the eleventh switch transistor T11 is turned on. The turned on eleventh switch transistor T1 connects the second reference signal terminal Vref2 having the high potential to the first node P1. Therefore, the potential of the first node P1 is the high potential. Since CKB=1, the first switch transistor T1 is turned on. The turned on first switch transistor T1 connects the second clock signal terminal CKB to the second node P2. Therefore, the potential of the second node P2 becomes the low potential, so that the thirteenth switch transistor T13 and the third switch transistor T3 are turned on. The turned on third switch transistor T3 provides the signal of the third reference signal terminal Vref3 having the high potential to the first node P1, and the turned on thirteen switch transistor T13 connects the control signal output terminal OUT to the third reference signal terminal Vref3 having the high potential. Therefore, the potential of the control signal output terminal OUT is the high potential, so that the fifth switch transistor T5 is turned off. Since END=0, the sixth switch transistor T6 is turned on. The turned on sixth switch transistor T6 provides the signal of the third reference signal terminal Vref3 having the high potential to the third node P3. Therefore, the potential of the third node P3 is the high potential, and the ninth switch transistor T9 and the seventh switch transistor T7 are turned off. Since the fourteenth switch transistor T14 is in a normal turn-on state, and at this time, the ninth switch transistor T9 is in the turn-off state, thus the gate of the eighth switch transistor T8 is connected to the fourth reference signal terminal Vref4 having the low potential through the fourteenth switch transistor T14. Therefore, the eighth switch transistor T8 is turned on. The turned on eighth switch transistor T8 connects the common voltage signal terminal VCOM with the touch signal output terminal TX, so that the touch signal output terminal TX outputs the common voltage signal.

That is, the phase T2 is a phase where the touch signal output terminal TX outputs the common voltage signal.

In subsequent periods of time, the touch signal output terminal will constantly output the common voltage signal until the active pulse signal of the signal input terminal Input is the low potential signal.

Figure 7B:
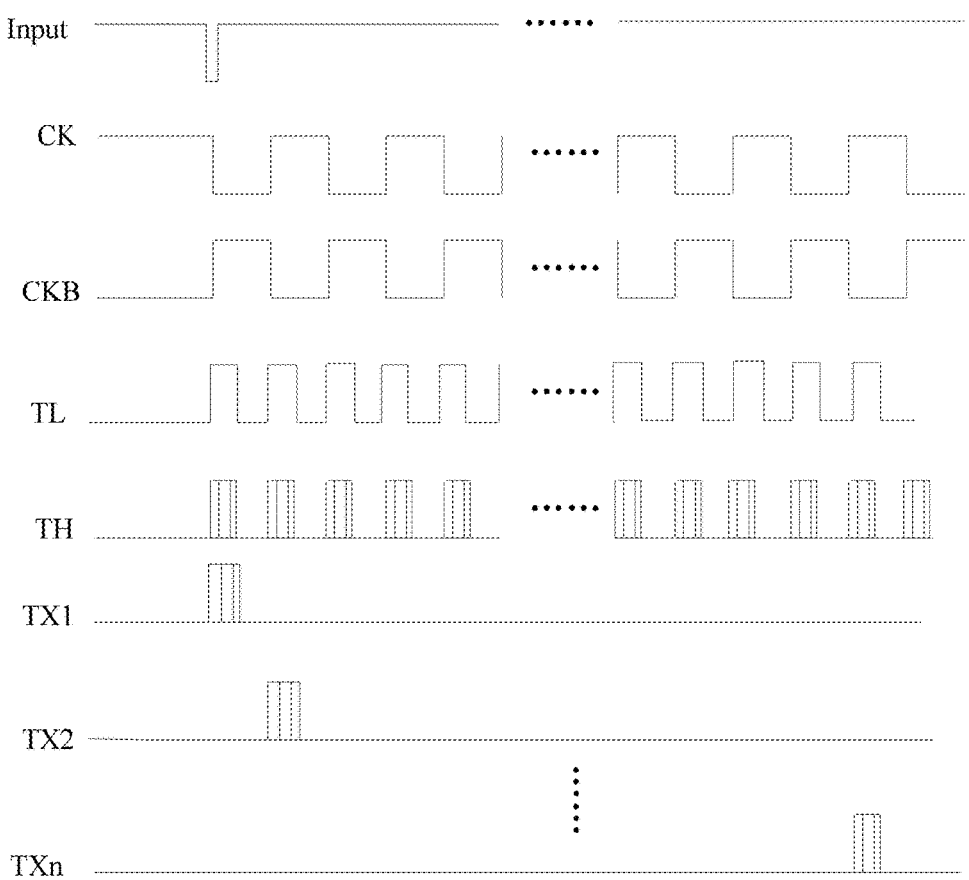

The above process is an operation process that one touch circuit outputs the high frequency signal and the common voltage signal respectively. In the entire touch circuits of the touch panel connected in cascades, under the control of respective signal control terminals, each stage of touch circuit outputs the high frequency signal or the common voltage signal according to the above operation process respectively as shown in FIG. 7b, which finally realizes the function that the touch circuits output the high frequency signal stage by stage, i.e., realizing the process of progressive touch scanning of the touch panel.

Based on the same inventive concept, there is provided in an embodiment of the present disclosure a display apparatus, comprising the touch panel provided in the embodiment of the present disclosure. The display apparatus can be applicable to any product or elements having display function, such as a mobile phone, a tablet computer, a television set, a display, a notebook computer, a digital frame, and a navigator or the like. Since the principle of the display apparatus for solving the problem is similar to that of the touch circuit, the implementation of the display apparatus can refer to the implementation of the touch circuit described above, and thus no further description is given herein.

The touch circuit, the touch panel and the display apparatus provided in the embodiments of the present disclosure realize the function that the touch circuit outputs the touch signal. Compared with the touch circuit formed by adopting more thin film transistors to construct a transmission gate, an inverter and a tri-state gate circuit in the prior art, the touch circuit provided in the embodiment of the present disclosure has simple structure and low power consumption.

Obviously, those skilled in the art can make various alternations and modifications to the present disclosure without departing from the spirit and scope of the present disclosure. As such, if these alternations and modifications of the present disclosure belong to the scope of the claims of the present disclosure, the present disclosure also intend to cover these alternations and modifications.

The present application claims the priority of a Chinese patent application No. 201510243727.7 filed on May 13, 2015. Herein, the content disclosed by the Chinese patent application is incorporated in full by reference as a part of the present disclosure.

What is claimed is:

1. A touch circuit, comprising:
   an input module, having a control terminal connected to an input signal terminal, an input terminal connected to a first reference signal terminal, and an output terminal connected to a first node, and configured to provide a signal of the first reference signal terminal to the first node under the control of the input signal terminal;
   a reset module, having a control terminal connected to a reset signal terminal, an input terminal connected to a second reference signal terminal, and an output terminal connected to the first node, and configured to provide a signal of the second reference signal terminal to the first node under the control of the reset signal terminal;
   a pull-up module, having a control terminal connected to the first node, an input terminal connected to a first clock signal terminal, and an output terminal connected to a control signal output terminal, and configured to provide a signal of the first clock signal terminal to the control signal output terminal when a potential of the first node is a first potential;
   a pull-down module, having a control terminal connected to a second node, an input terminal connected to a third reference signal terminal, and an output terminal connected to the control signal output terminal, and configured to provide a signal of the third reference signal terminal to the control signal output terminal when a potential of the second node is the first potential;
   a pull-down control module, connected to a second clock signal terminal, the first node and the second node respectively, and configured to provide a signal of the second clock signal terminal to the second node under the control of the second clock signal terminal, control the potential of the second node as a second potential when the potential of the first node is the first potential, and control the potential of the first node as the second potential when the potential of the second node is the first potential; and
   a touch signal output module, having a first input terminal connected to the control signal output terminal, a second input terminal connected to a high frequency signal terminal, and a third input terminal connected to a common voltage signal terminal, and configured to output a high frequency signal or a common voltage signal to a touch signal output terminal under the control of the control signal output terminal.

2. The touch circuit according to claim 1, wherein when an active pulse signal of the input signal terminal is a high potential signal, the first potential is a high potential, and the second potential is a low potential; when an active pulse signal of the input signal terminal is a low potential signal, the first potential is a low potential, and the second potential is a high potential; and when the input signal terminal starts to output the active pulse signal, the first clock signal terminal and the second clock signal terminal output a first potential signal alternatively.

3. The touch circuit according to claim 1, wherein the pull-down control module comprises:
   a first pull-down control unit, having a control terminal and an input terminal both connected to the second clock signal terminal, and an output terminal connected to the second node, and configured to provide the signal of the second clock signal terminal to the second node under the control of the second clock signal terminal;
   a second pull-down control unit, having a control terminal connected to the first node, an input terminal connected to the third reference signal terminal, and an output terminal connected to the second node, and configured to provide the signal of the third reference signal terminal to the second node when the potential of the first node is the first potential; and
   a third pull-down control unit, having a control terminal connected to the second node, an input terminal connected to the third reference signal terminal, and an output terminal connected to the first node, and configured to provide the signal of the third reference signal terminal to the first node when the potential of the second node is the first potential.

4. The touch circuit according to claim 3, wherein the pull-down control module further comprises:
   a fourth pull-down control unit, having a control terminal connected to the control signal output terminal, an input terminal connected to the third reference signal terminal, and an output terminal connected to the second node, and configured to provide the signal of the third reference signal terminal to the second node when the potential of the control signal output terminal is the first potential.

5. The touch circuit according to claim 3, wherein the first pull-down control unit comprises:
   a first switch transistor; whose gate and source both connected to the second clock signal terminal, and drain connected to the first node.

6. The touch circuit according to claim 3, wherein the second pull-down control unit comprises:
   a second switch transistor, whose gate connected to the first node, source connected to the third reference signal terminal, and drain connected to the second node.

7. The touch circuit according to claim 3, wherein the third pull-down control unit comprises:
   a third switch transistor, whose gate connected to the second node, source connected to the third reference signal terminal, and drain connected to the first node.

8. The touch circuit according to claim 4, wherein the fourth pull-down control unit comprises:
   a fourth switch transistor, whose gate connected to the control signal output terminal, source connected to the third reference signal terminal, and drain connected to the second node.

9. The touch circuit according to claim 1, wherein the touch signal output module comprises: a high frequency signal output unit, a common voltage signal output unit, a pull-up unit and a pull-down unit; wherein the pull-up unit has a control terminal which is a first input terminal of the touch signal output module, an input terminal connected to a low frequency signal terminal, and an output terminal connected to the third node, and is configured to provide a signal of the low frequency signal terminal to the third node when the potential of the control signal output terminal is the first potential;

the pull-down unit has a control terminal connected to an end signal terminal, an input terminal connected to the third node, and an output terminal connected to the third reference signal terminal, and is configured to provide the signal of the third reference signal terminal to the third node under the control of the end signal terminal;

the high frequency signal output unit has a control terminal connected to the third node, an input terminal which is a second input terminal of the touch signal output module, and an output terminal connected to the touch signal output terminal, and is configured to control the touch signal output terminal to output the high frequency signal when the potential of the third node is the first potential; and the common voltage signal output unit is connected among the third node, the third reference signal terminal, a fourth reference signal terminal, the common voltage signal terminal, and the touch signal output terminal, and is configured to control the touch signal output terminal to output the common voltage signal when the potential of the third node is the second potential.

10. The touch circuit according to claim 9, wherein the pull-up unit comprises:
a fifth switch transistor, whose gate connected to the control signal output terminal, source connected to low frequency signal terminal, and drain connected to the third node.

11. The touch circuit according to claim 9, wherein the pull-down unit comprises:
a sixth switch transistor, whose gate connected to the end signal terminal, source connected to the third reference signal terminal, and drain connected to the third node.

12. The touch circuit according to claim 9, wherein the high frequency signal output unit comprises:
a seventh switch transistor, whose gate connected to the third node, source connected to the high frequency signal terminal, and drain connected to the touch signal output terminal; and
a first capacitor, connected between the gate and drain of the seventh transistor.

13. The touch circuit according to claim 9, wherein the common voltage signal output unit comprises:
an eight switch transistor, whose gate connected to the fourth reference signal terminal, source connected to the common voltage signal terminal, and drain connected to the touch signal output terminal; and
a ninth switch transistor, whose gate connected to the third node, source connected to the third reference signal terminal, and drain connected to the fourth reference signal terminal.

14. The touch circuit according to claim 1, wherein the input module comprises:
a tenth switch transistor, whose gate connected to the input signal terminal, source connected to the first reference signal terminal, and drain connected to the first node.

15. The touch circuit according to claim 1, wherein the reset module comprises:
an eleventh switch transistor, whose gate connected to the reset signal terminal, source connected to the second reference signal terminal, and drain connected to the first node.

16. The touch circuit according to claim 1, wherein the pull-up module comprises:
a twelfth switch transistor, whose gate connected to the first node, source connected to the first clock signal terminal, and drain connected to the control signal output terminal; and
a second capacitor, connected between the gate and drain of the twelfth switch transistor.

17. The touch circuit according to claim 1, wherein the pull-down module comprises:
a thirteenth switch transistor, whose gate connected to the second node, source connected to the third reference signal terminal, and drain connected to the control signal output terminal.

18. A touch panel, comprising a plurality of touch circuits connected in cascades according to claim 1, wherein
except for a first stage of touch circuit, control signal output terminals of other stages of touch circuits are all connected to a reset signal terminal of an adjacent previous stage of touch circuit; an
except for a last stage of touch circuit, control signal output terminals of other stages of touch circuits are all connected to a signal input terminal of an adjacent next stage of touch circuit.

19. A display apparatus, comprising the touch panel according to claim 18.

20. The touch panel according to claim 18, wherein when an active pulse signal of the input signal terminal is a high potential signal, the first potential is a high potential, and the second potential is a low potential; when an active pulse signal of the input signal terminal is a low potential signal, the first potential is a low potential, and the second potential is a high potential; and when the input signal terminal starts to output the active pulse signal, the first clock signal terminal and the second dock signal terminal output a first potential signal alternatively.

* * * * *